Dec. 6, 1955 W. L. PRITCHARD 2,726,333
AUTOMATIC FREQUENCY CONTROL SYSTEMS
Filed March 19, 1953 2 Sheets-Sheet 1
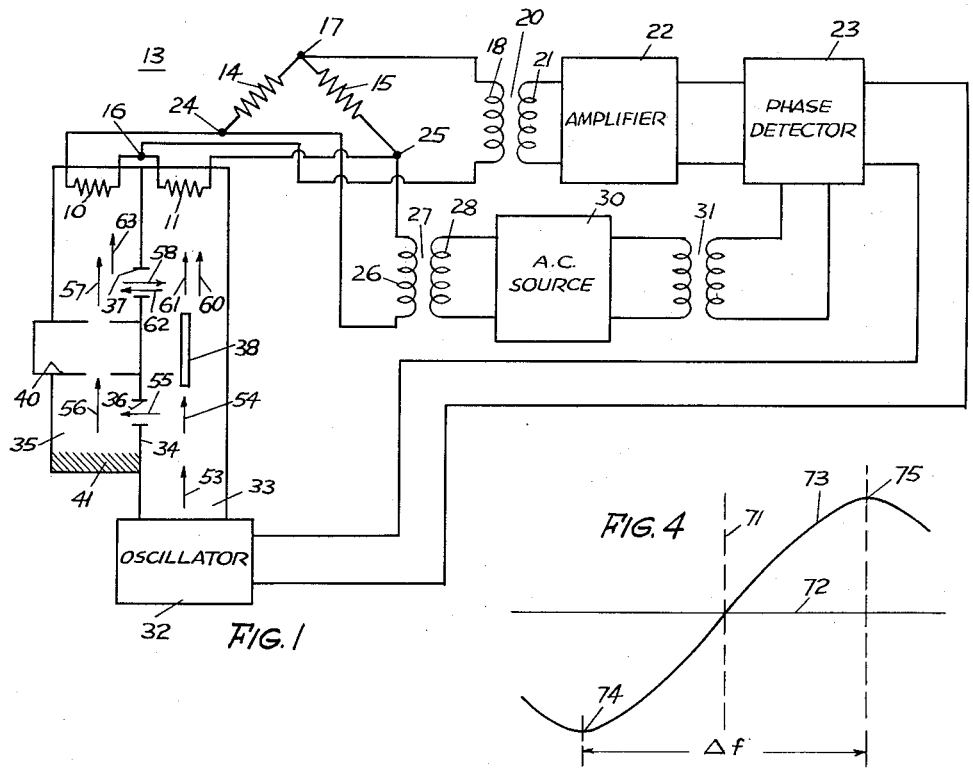
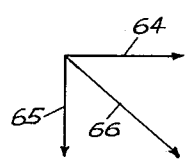
FIG. 3a
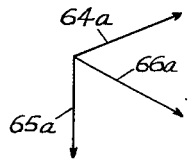
FIG. 3c
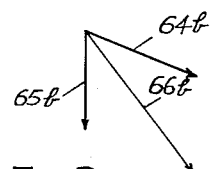
FIG. 3e
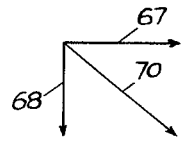
FIG. 3b
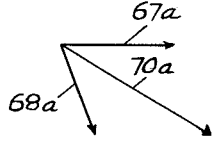
FIG. 3d
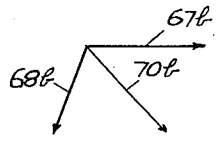
FIG. 3f
INVENTOR
WILBUR L. PRITCHARD
BY Elmer J. Gorn
ATTORNEY

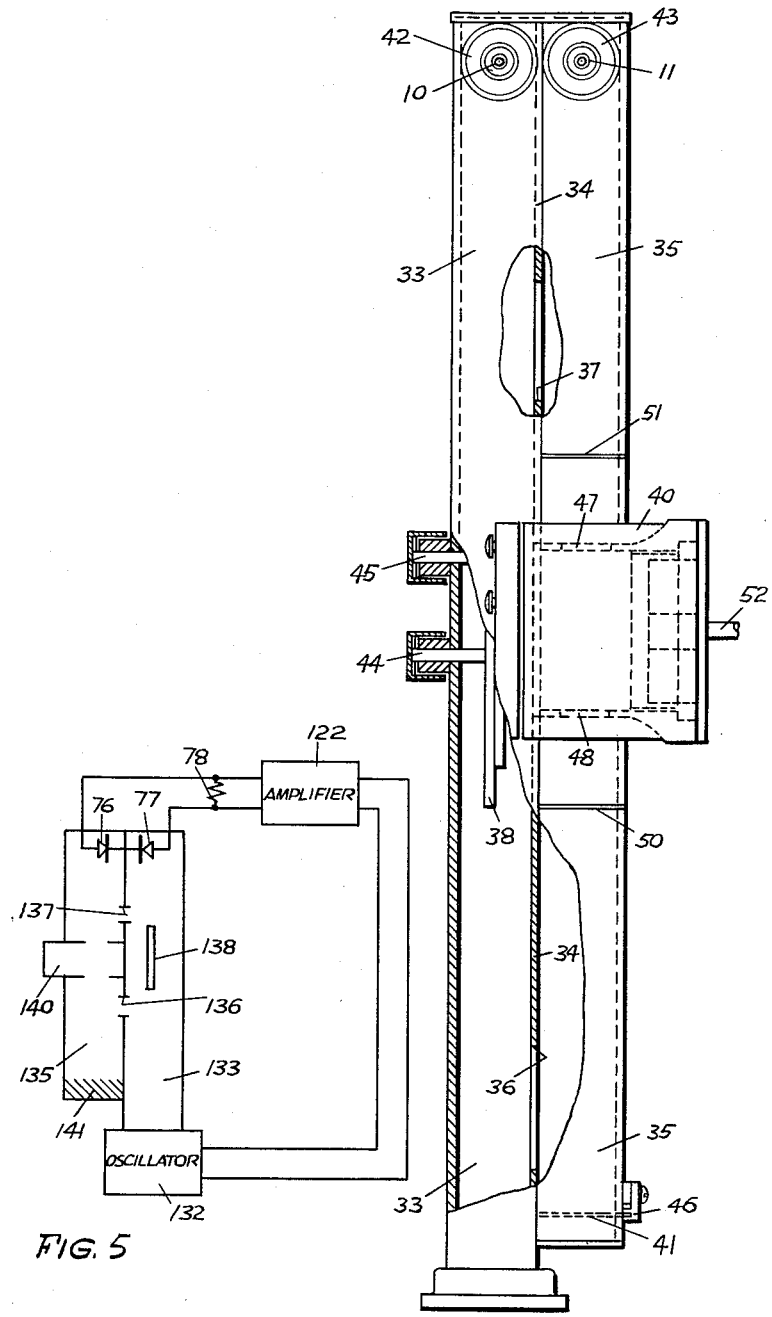

United States Patent Office 2,726,333
Patented Dec. 6, 1955

2,726,333

AUTOMATIC FREQUENCY CONTROL SYSTEMS

Wilbur L. Pritchard, Watertown, Mass., assignor to Raytheon Manufacturing Company, Newton, Mass., a corporation of Delaware Application March 19, 1953, Serial No. 343,342

11 Claims. (Cl. 250—36)

This invention relates to automatic frequency control systems, and more particularly to the frequency discriminator of such a circuit utilizing a pair of hybrid junctions, preferably of the directional-coupler type supplying power to power-sensing devices, such as barretters connected in a bridge circuit or to rectifiers, to develop a frequency correcting voltage proportional to the frequency deviation.

The invention can be used in a circuit such as that described in the copending application of Malcolm C. Vosburg, Serial No. 253,841, filed October 30, 1951, now Patent No. 2,697,797 issued December 21, 1954. In such a circuit, two barretters are used as two arms of a bridge with stable resistors in the other two branches. A. C. power is applied across one diagonal of the bridge and any unbalance voltage is taken from across the other diagonal and compared with a sample of the applied voltage in a phase detector which may be a two-phase motor, in which case the output is a mechanical displacement, or a phase designator, in which case the output is a voltage. In either case, the output is utilized to shift the frequency of the controlled oscillator back to the desired frequency. The output of the oscillator is fed to the barretters which are mounted in two of the wave guide arms of a double directional coupler. The energy from the oscillator proceeds down an arm of the first hybrid junction that preferably is of the directional coupler type and splits at the first coupling equally between the two guides to produce energies in the two guides in phase quadrature with each other. The energy in the second guide enters a resonant cavity and undergoes no change in phase if the energy is at the desired frequency. That part of the energy proceeding through the first guide passes through a ninety degree phase shifter. Both streams of energy split at the second coupling and recombine in phase quadrature in each guide and appear at barretters mounted in the ends in equal amplitude when the energy is at the desired frequency, so that no correcting signal is produced by the bridge circuit. However, when the signal is not at the desired frequency, a correcting signal is produced by the bridge circuit and is applied at the oscillator to bring it back to the desired frequency. Such a system is more compact when the hybrid junctions are of the directional coupler type rather than of the "Magic T" type, as such couplers require little more than the space of two sections of wave guide dimensioned for efficient transmission of radio frequency at the operating frequency of the system.

Other and further advantages of this invention will be apparent as the description thereof progresses, reference being had to the accompanying drawings, wherein:

Fig. 1 is a schematic diagram of a circuit utilizing the principle of the invention;

Fig. 2 is a side elevation partly broken away of the frequency discriminator shown diagrammatically in Fig. 1;

Figs. 3a through 3f are vector diagrams of the voltage at the barretters when the energy is at the resonant frequency or above or below this frequency;

Fig. 4 is a diagram of the variation of the control voltage with relation to frequency; and Fig. 5 is a schematic diagram of a modified circuit utilizing the invention.

In Fig. 1, the reference numerals 10 and 11 designate a pair of heat-sensitive resistors, such as barretters or thermistors, connected as two arms of a bridge designated, generally, by the reference numeral 13. The other two arms of the bridge 13 comprise resistors 14 and 15. The connection 16 between the two barretters 10 and 11 and the connection 17 between the resistors 14 and 15 are connected to the primary 18 of a transformer 20, the secondary 21 of which is connected to an input of an amplifier 22. The output of the amplifier 22 is connected to the input of a phase detector 23. The junction 24 of the resistor 14 and the barretter 10, and the junction 25, of the resistor 15 and the barretter 11 are connected to the primary 26 of a transformer 27, the secondary 28 of which is connected to a source 30 of alternating current. A portion of the current from the source 30 is also coupled through a transformer 31 to a second input of the phase detector 23. The output of the phase detector 23 is applied to the frequency-determining circuits of an oscillator 32. The output of the oscillator 32 is applied to a wave guide 33 having a common wall 34 with a second wave guide section 35. Two openings, 36 and 37, are formed in this common wall 34. A phase shifting structure 38 is positioned in the wave guide 33 between the two openings 36 and 37. The barretter 11 is positioned at the far end of the wave guide 33. A resonant cavity 40 is positioned between the openings 36 and 37 in the wave guide section 35. The thermistor 10 is positioned at one end of the wave guide section 35 and a terminating resistor 41 at the other end.

The details of the dual directional coupler discriminator are best shown in Fig. 2. The thermistors 10 and 11 are shown in holders 42 and 43 set in wave guides 33 and 35 having a common wall 34 joined by openings 36 and 37. The main guide 33 contains a phase shifter 38 shown in the form of a sheet of plastic positioned in the guide by adjustable supports 44 and 45. The auxiliary guide 35 contains a terminating resistor 41 shown as a card resistor positioned near one end of the guide by a support 46. The resonant cavity 40 positioned in the wave guide 35 between the openings 36 and 37 is shown coupled to the wave guide through two openings 47 and 48. The cavity is hermetically sealed from the rest of the wave guide 35 by irises 50 and 51 so that it may be evacuated through exhaust tube 52. These details can be modified to suit particular applications.

The operation of the circuit can best be understood with reference to Figs. 1, 3a, 3b, 3c, 3d, 3e, and 3f. As the radio frequency energy of the oscillator 32 proceeds down the guide 33, in the direction indicated by the arrow 53, it splits equally between the guides 33 and 35 at the opening 36 in the common wall 34 with half the energy proceeding down the guide 33 in the original direction, as indicated by the arrow 54, and half the energy passing through the opening 36 into the auxiliary wave guide section 35, as indicated by the arrow 55 in a phase which is at ninety degrees to that of the original wave 53. This energy in the auxiliary guide proceeds into the resonant cavity 40, as indicated by the arrow 56. Any energy proceeding in the opposite direction in the auxiliary guide is absorbed by the resistor 41. The wave does not change in phase passing through this cavity if it is at the resonant frequency of the cavity, and thus emerges from the cavity in the same phase it would have had had there been no cavity. Half of this energy proceeds to the barretter 10, as indicated by the arrow 57, and half is converted through the opening 37 into the main guide 33, as indicated by the arrow 58. This diverted energy is again shifted in phase by ninety degrees and proceeds to the barretter 11, as indicated by the arrow 60. Meanwhile, that part of the original energy not diverted into the auxiliary guide 10 through the opening 36 proceeds on through a phase shifting device 38 which shifts the phase of this part of the energy by as much as the passage through the opening 36 shifts the phase of the energy represented by the arrow 56 usually 90°. The energy emerging from the phase-shifter 38 splits in half, and half proceeds on to the barretter 11, as indicated by the arrow 61, and half is diverted through the opening 37 into the auxiliary guide 35, as indicated by the arrow 62. In passing through the opening 37, the energy is shifted ninety degrees in phase and proceeds to the barretter 10, as indicated by the arrow 63. Variable impedances may be inserted into the guides to assure the desired equal division of the energy between the guides.

The vector 64 in Fig. 3a represents the energy emerging from the resonant cavity 40 at the desired frequency. This is the energy indicated in Fig. 1 by the arrow 57. The vector 65 in Fig. 3a represents the energy that has come from the main cavity through opening 37 and is represented in Fig. 1 by the arrow 63. The resultant voltage is represented by the vector 66 in Fig. 3a. Similarly, the vector 67 in Fig. 3b represents the energy that has come down the main guide 33 and is designated by the arrow 60 in Fig. 1. The vector 68 represents the energy that has passed through the opening 36 into the auxiliary guide 35 and through the resonant cavity 40 and the second opening 37 back into the main guide 33 and is represented by the arrow 61 in Fig. 1. The vector 70 represents the resultant of these two voltages.

Figs. 3c and 3d represent the voltage vectors when the frequency is above the resonant frequency of the cavity. The voltage that has come through the cavity has been shifted in phase in a counterclockwise direction, as represented by the vector 64a in Fig. 3c. The vector 65a represents the energy coming through the opening 37 into the cavity 35 and remains the same in phase. The resultant vector 66a is shifted in a counterclockwise position from that of the vector 66 in Fig. 3a. Similarly, in the main guide the energy that has come straight through remains the same in phase, as shown by the vector 67a in Fig. 3d, while the energy that has come through the auxiliary guide 10 is shifted in phase in a counterclockwise direction, as shown by the vector 68a, and the resultant voltage is also shifted in a counterclockwise direction, as shown by the vector 70a.

Figs. 3e and 3f represent the voltage vectors when the frequency is below the resonant frequency of the cavity. The vector 64b represents the energy that has passed through the auxiliary guide 35 and is shifted clockwise, while the energy that has come from the main guide remains the same, as shown by the vector 65b, and the resultant shifts counterclockwise to the position shown by the vector 66b. Similarly, the energy that has come straight through the main guide 33 to the barretter 11 remains the same in phase, as shown by the vector 67b in Fig. 3f, while the energy that reaches the barretter through the auxiliary guide 35 is shifted clockwise in phase, as shown by the vector 68b, and the resultant is also shifted clockwise, as shown by the vector 70b.

When the energy from the control oscillator 32 is at the desired frequency, the barretters 10 and 11 are heated equally, as shown by the equal length of the vectors 66 and 70 in Figs. 3a and 3b. The bridge 13 is balanced. Thus the voltage appearing at the output of the amplifier 22 is in phase with the voltage from the source 30, so that there is no output from the phase detector 23 and no shift in the operating frequency of the oscillator 32. However, when the operating frequency of the oscillator 32 goes above the desired value, the barretter 11 is heated more than the barretter 10, as shown by the fact that the vector 70a, in Fig. 3d, is longer than the vector 66a in Fig. 3c. This difference unbalances the bridge 13 in a direction to produce a voltage from the phase detector 23 that lowers the operating frequency of the oscillator 32, either by the mechanical movement of a frequency-determining element, such as a capacitor, or by the application of this voltage to the grid of a reactance tube associated with the oscillator or any other convenient means. Conversely, when the operating frequency of the oscillator 32 drops below the desired frequency, the barretter 10 is heated more than the barretter 11, as shown by the greater length of the vector 66b in Fig. 3e, as compared with the length of the vector 70b in Fig. 3f. As a result, the bridge 13 is unbalanced in a direction to produce a voltage from the phase detector that raises the operating frequency of the oscillator 32. This variation in the output of the phase detector 23 with frequency is shown in Fig. 4 where the output of the detector 23 is plotted vertically along the vertical line 71 and the frequency deviation along the horizontal line 72 to give a curve 73 that is approximately linear between the points 74 and 75.

Fig. 5 shows how a similar frequency dependent voltage can be obtained by substituting a pair of rectifiers 76 and 77, such as silicon crystals, for the thermistors 10 and 11 of Fig. 1. The microwave part of the circuit remains the same except for the substitution of the crystals for the thermistors. The crystals are connected in opposing polarity across a resistor 78 in the input to an amplifier 123, the output of which is applied to the oscillator 132 to correct its frequency in the manner described above.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In a frequency-sensitive circuit, a source of radio frequency energy, a hybrid junction, means to apply the output of the source to one arm of the junction, a resonant cavity, means to apply the energy from a second arm of the junction to the cavity, means to shift the phase of the output of a third arm of said junction, a second hybrid junction, means to apply the output of the phase shifter to an arm of the second junction, means to couple the resonant cavity to a second arm of the second junction, means coupled to the third and fourth arms of the second junction to obtain a voltage proportional to the deviation of the frequency of the oscillator from the desired frequency and in a direction determined by the direction of the deviation.

2. In a frequency-sensitive circuit, a source of radio frequency energy, a hybrid junction comprising a pair of wave guides separated by a common wall with an opening, means to apply the output of the source to one end of one of the wave guides, a resonant cavity coupled to the other end of said wave guide, means to shift the phase of the energy positioned in the far end of the second wave guide, a second junction comprising a second pair of wave guide sections coupled together by an opening in a common wall, one end of one of the said second pair of wave guide sections coupled to the resonant cavity at one end, means coupled to the output ends of the second junction to obtain a voltage proportional to the deviation of the frequency of the oscillator from the desired frequency and in a direction determined by the direction of the deviation.

3. In a frequency-sensitive circuit, a source of radio frequency energy, a hybrid junction, means to apply the output of the source to one arm of the junction, a resonant cavity, means to apply the energy from a second arm of the junction to the cavity, means to shift the phase of the output of a third arm of said junction, a second hybrid junction, means to apply the output of the phase shifter to an arm of the second junction, means to couple the resonant cavity to a second arm of the second junction, means coupled to the third and fourth arms of the second junction to obtain a voltage proportional to the deviation of the frequency of the oscillator from the desired frequency and in a direction determined by the direction of the deviation comprising a pair of non-linear resistors, one mounted in the third arm and the other in the fourth arm of the second junction and a pair of stable resistors connected in a bridge circuit, means for applying an alternating current to the bridge to obtain an alternating current voltage proportional to the unbalance and having a phase indicative of the direction of the unbalance and phase-sensitive means.

4. In a frequency-sensitive circuit, a source of radio frequency energy, a hybrid junction comprising a pair of wave guides separated by a common wall with an opening, means to apply the output of the source to one end of one arm of the wave guides, a resonant cavity coupled to the other end of said wave guide, means to shift the phase of the energy positioned in the far end of the second wave guide, a second hybrid junction comprising a second pair of wave guide sections coupled together by an opening in a common wall, one end of one of said second pair of wave guide sections coupled to the resonant cavity at one end, means coupled to the output ends of the second junction to obtain a voltage proportional to the deviation of the frequency of the oscillator from the desired frequency and in a direction determined by the direction of the deviation comprising a pair of non-linear resistors, one mounted in the third arm and the other in the fourth arm of the second junction and a pair of stable resistors connected in a bridge circuit, means for applying an alternating current to the bridge to obtain an alternating voltage proportional to the unbalance and having a phase indicative of the direction of the unbalance and phase-sensitive means.

5. In a frequency-sensitive circuit, a source of radio frequency energy, a hybrid junction comprising a pair of wave guides separated by a common wall with an opening, means to apply the output of the source to one end of one of the wave guides, a resonant cavity coupled to the other end of said wave guide, means to shift the phase of the energy positioned in the far end of the second wave guide, a second junction comprising a second pair of wave guide sections coupled together by an opening in a common wall, one end of one of said second pair of wave guide sections coupled to the resonant cavity at one end, means coupled to the output ends of the second junction to obtain a voltage proportional to the deviation of the frequency of the oscillator from the desired frequency and in a direction determined by the direction of the deviation comprising a pair of non-linear resistors, one mounted in one output of the second junction and a second mounted in the other output of the second junction, a pair of stable resistors connected in a bridge circuit, means for applying an alternating current to the bridge to obtain an alternating voltage proportional to the unbalance and having a phase indicative of the direction of the unbalance and phase-sensitive means.

6. In a frequency-sensitive circuit, a source of radio frequency energy, a hybrid junction, means to apply the output of the source to one arm of the junction, a resonant cavity, means to apply the energy from a second arm of the junction to the cavity, means to shift the phase of the output of a third arm of said junction, a second hybrid junction, means to apply the output of the phase shifter to an arm of the second junction, means to couple the resonant cavity to a second arm of the second junction, means coupled to the third and fourth arms of the second junction to obtain a voltage proportional to the deviation of the frequency of the oscillator from the desired frequency and in a direction determined by the direction of the deviation comprising a pair of rectifiers, one mounted in the third arm and the other mounted in the fourth arm of the second junction, and means for connecting the rectifiers in opposition and applying the output to correct the frequency of the oscillator.

7. In a frequency-sensitive circuit, a source of radio frequency energy, a hybrid junction comprising a pair of wave guides separated by a common wall with an opening, means to apply the output of the source to one end of one of the wave guides, a resonant cavity coupled to the other end of said wave guide, means to shift the phase of the energy positioned in the far end of the second wave guide, a second hybrid junction comprising a second pair of wave guide sections coupled together by an opening in a common wall, one end of one of said second pair of wave guide sections coupled to the resonant cavity at one end, means coupled to the output ends of the second junction to obtain a voltage proportional to the deviation of the frequency of the oscillator from the desired frequency and in a direction determined by the direction of the deviation comprising a pair of rectifiers, one mounted in the third arm and the other mounted in the fourth arm of the second hybrid junction, and means for connecting the rectifiers in opposition and applying the output to correct the frequency of the oscillator.

8. In a frequency-sensitive circuit, a source of radio frequency energy, a hybrid junction comprising a pair of wave guides separated by a common wall with an opening, means to apply the output of the source to one end of one of the wave guides, a resonant cavity coupled to the other end of said wave guide, means to shift the phase of the energy positioned in the far end of the second wave guide, a second hybrid junction comprising a second pair of wave guide sections coupled together by an opening in a common wall, one end of one of said second pair of wave guide sections coupled to the resonant cavity at one end, means coupled to the output ends of the second hybrid junction to obtain a voltage proportional to the deviation of the frequency of the oscillators from the desired frequency and in a direction determined by the direction of the deviation comprising a pair of rectifiers, one mounted in one output of the second hybrid junction and the other mounted in the other output of the second hybrid junction, and means for connecting the rectifiers in opposition and applying the output to correct the frequency of the oscillator.

9. In a frequency-sensitive device, a first and second hybrid junction, each comprising a pair of wave guide sections having a common wall and an opening in this common wall, means to apply radio frequency energy to one end of one of the wave guide sections of the first said hybrid junction, phase-shifting means coupled between the other end of this section of wave guide and an end of one of the wave guides of the second hybrid junction, a resonant cavity coupling the second wave guides of the first and second hybrid junctions and non-linear elements, means for mounting in the output ends of the wave guides of the second hybrid junction.

10. In a frequency-sensitive device, a first and second hybrid junction, each comprising a pair of wave guide sections having a common wall and an opening in this common wall, means to apply radio frequency energy to one end of one of the wave guide sections of the first said hybrid junction, phase-shifting means coupled between the other end of this section of wave guide and an end of one of the wave guides of the second hybrid junction, a resonant cavity coupling the second wave guides of the first and second hybrid junctions, and temperature-sensitive elements mounted in the output ends of the wave guides of the second hybrid junction.

11. In a frequency-sensitive device, a first and second hybrid junction, each comprising a pair of wave guide sections having a common wall and an opening in this common wall, means to apply radio frequency energy to one end of one of the wave guide sections of the first said hybrid junction, phase-shifting means coupled between the other end of this section of wave guide and an end of one of the wave guides of the second hybrid junction, a resonant cavity coupling the second wave guides of the first and second hybrid junctions, and rectifiers mounted in the output ends of the wave guides of the second hybrid junction.

References Cited in the file of this patent

UNITED STATES PATENTS

| | | |
|---|---|---|
| 2,462,841 | Bruck et al. | Mar. 1, 1949 |
| 2,486,001 | Bruck et al. | Oct. 25, 1949 |
| 2,585,173 | Riblet | Feb. 12, 1952 |
| 2,586,993 | Riblet | Feb. 26, 1952 |